United States Patent [19]

Shiobara et al.

[11] Patent Number: 5,298,548
[45] Date of Patent: Mar. 29, 1994

[54] EPOXY RESIN COMPOSITION AND SEMICONDUCTOR DEVICES ENCAPSULATED THEREWITH

[75] Inventors: Toshio Shiobara; Takayuki Aoki, both of Annaka; Kazutoshi Tomiyoshi, Takasaki; Hisashi Shimizu, Annaka; Takashi Tsuchiya, Takasaki, all of Japan

[73] Assignee: Shin-Etsu Chemical Co., Ltd., Tokyo, Japan

[21] Appl. No.: 885,965

[22] Filed: May 20, 1992

[30] Foreign Application Priority Data

May 21, 1991 [JP] Japan ................... 3-145502

[51] Int. Cl.$^5$ .................. C08G 59/22; C08L 63/00
[52] U.S. Cl. ..................... 523/443; 523/466; 525/476; 525/481; 525/482; 525/487; 525/534; 528/97; 257/787
[58] Field of Search ............... 523/443, 466; 525/481, 525/482, 534, 476, 487; 528/97; 357/72

[56] References Cited

U.S. PATENT DOCUMENTS

| | | | |
|---|---|---|---|
| 3,384,618 | 5/1968 | Imoto et al. | 528/151 |
| 4,551,508 | 11/1985 | Urasaki | 525/507 |
| 4,859,722 | 8/1989 | Shiobara et al. | 523/436 |
| 4,877,822 | 10/1989 | Itoh et al. | 525/476 |
| 5,068,293 | 11/1991 | Kaji et al. | 528/97 |
| 5,190,995 | 3/1993 | Shiobara et al. | 528/97 |

FOREIGN PATENT DOCUMENTS

| | | |
|---|---|---|
| 0429667A | 6/1991 | European Pat. Off. . |
| 53-000299 | 1/1978 | Japan . |
| 60-112813 | 6/1985 | Japan . |
| 02088621 | 3/1990 | Japan . |
| 02091118 | 3/1990 | Japan . |
| 02099514 | 4/1990 | Japan . |
| 03000717 | 1/1991 | Japan . |

OTHER PUBLICATIONS

English language translation of Japanese Kokai 63-251419 (Oct. 18, 1988).

*Primary Examiner*—Frederick Krass
*Attorney, Agent, or Firm*—Birch, Stewart, Kolasch & Birch

[57] ABSTRACT

An epoxy resin composition comprising (A) a naphthalene ring-containing epoxy resin, (B) a biphenyl-containing epoxy resin, (C) a specific phenolic resin, and (D) an inorganic filler shows good flow and cures to products having low modulus of elasticity, especially at temperatures above Tg, a low coefficient of expansion, high Tg irrespective of low stresses, and minimized water absorption. Then semiconductor devices encapsulated with the present composition remain highly reliable even after being subject to thermal shocks upon surface mounting.

15 Claims, No Drawings

EPOXY RESIN COMPOSITION AND SEMICONDUCTOR DEVICES ENCAPSULATED THEREWITH

This invention relates to epoxy resin compositions having improved flow and curing into products having a low coefficient of expansion, a high glass transition temperature, and low moisture absorption and semiconductor devices encapsulated with cured epoxy resin compositions.

BACKGROUND OF THE INVENTION

The mainstream of the modern semiconductor industry involves resin encapsulated diodes, transistors, IC, LSI, and super LSI. Among various resin compounds for encapsulating semiconductor devices, epoxy resin compositions comprising curable epoxy resins blended with curing agents and various additives are most widely used because they are generally improved in moldability, adhesion, electrical properties, mechanical properties and moisture resistance over the rest of thermosetting resins. The present day trend for these semiconductor devices is toward an increasingly high degree of integration and increased chip size therewith. Packages, on the other hand, are desired to be smaller and thinner in outer dimensions to meet the demands of compactness and light weight for electronic equipment. Further, as to the attachment of semiconductor parts on circuit boards, surface mounting of semiconductor parts is now often employed for reasons of increased part density on boards and reduced board thickness.

A common approach to the surface mounting of semiconductor parts is to dip entire semiconductor devices in a solder bath or to pass them through a hot zone of molten solder. Thermal shocks associated with this process cause encapsulating resin layers to crack or incur separation at the interface between the lead frames or chips and the encapsulating resin. Such cracks and separation become more outstanding if the semiconductor device encapsulating resin layers have absorbed moisture prior to thermal shocks encountered during surface mounting. Since encapsulating resin layers, however, inevitably absorb moisture in practical manufacturing steps, epoxy resin-encapsulated semiconductor devices after mounting sometimes suffer from a loss of reliability.

SUMMARY OF THE INVENTION

The present invention has been made to overcome the above-mentioned problems of the prior art, and its object is to provide a new and improved epoxy resin composition exhibiting improved flow behavior and curing into products featuring a low coefficient of expansion, a high glass transition temperature (Tg), low stresses, and low moisture absorption.

Another object is to provide a semiconductor device encapsulated with a cured product of the epoxy resin composition which remains fully reliable after thermal shocks during surface mounting.

The inventors have found that by blending (A) a naphthalene ring-containing epoxy resin, (B) a biphenyl-containing epoxy resin, (C) a specific phenolic resin, and (D) an inorganic filler, there is obtained an epoxy resin composition which has improved flow and cured into a product having a low coefficient of expansion, a high glass transition temperature (Tg), and low stresses as characterized by a lowering of modulus of the elasticity in a temperature range above Tg. As opposed to prior art conventional epoxy resin compositions which were obtained by a method designed so as to provide a low modulus of elasticity, but accompanied by such drawbacks as a lowering of Tg and a loss of strength, the epoxy resin composition as presently formulated can yield cured products having improved properties which were not found in the conventional epoxy resin compositions, that is, cured products which are free of a lowering of Tg, have a low modulus of elasticity and absorb little moisture. The composition is moldable over semiconductor devices. In addition, semiconductor devices encapsulated with cured products of the presently formulated epoxy resin composition remain highly reliable after thermal shocks during surface mounting. Therefore, the presently formulated epoxy resin composition is applicable to the encapsulation of semiconductor devices of all types including SOP, SOJ, TSOP and TQFP types since it has quite improved properties as encapsulants for surface mounting semiconductor devices.

Based on the above finding, the present invention provides an epoxy resin composition comprising (A) a naphthalene ring-containing epoxy resin of the following general formula (1), (B) a biphenyl-containing epoxy resin of the following general formula (2), (C) a phenolic resin of the following general formula (3), and (D) an inorganic filler.

Formula (1):

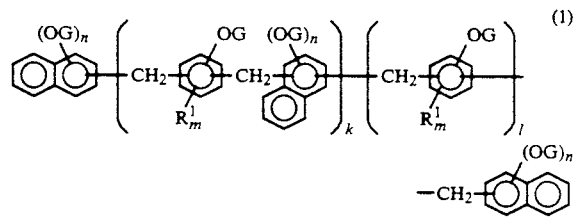

In formula (1), $R^1$ is a hydrogen atom or an alkyl group having 1 to 10 carbon atoms, OG is

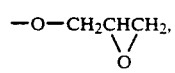

letter k is an integer of from 0 to 5, l is an integer of from 0 to 3, m is an integer of from 0 to 2, and n is equal to 1 or 2. When n is equal to 2, the two OG groups may be attached to either one ring or both rings of the naphthalene ring.

Formula (2):

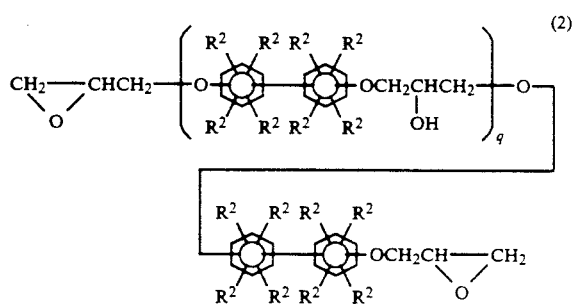

In formula (2), $R^2$ is a hydrogen atom, a halogen atom or a monovalent hydrocarbon group having 1 to 5 carbon atoms, and letter q is an integer of form 0 to 5.

Formula (3):

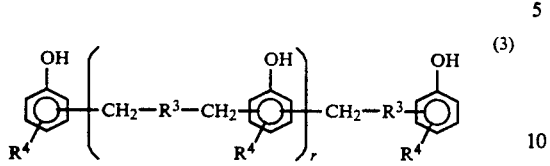
(3)

In formula (3), $R^3$ is selected from the group consisting of

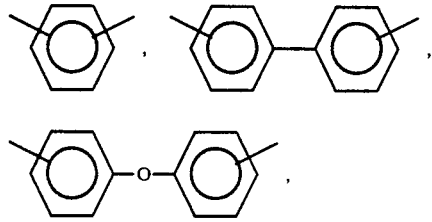

and substituted ones thereof in which some or all of the hydrogen atoms are replaced by alkyl groups having 1 to 5 carbon atoms, $R^4$ is a hydrogen atom or an alkyl group having 1 to 4 carbon atoms, and letter r is an integer of from 0 to 5.

DETAILED DESCRIPTION OF THE INVENTION

As mentioned above, the epoxy resin composition of the present invention is comprised of (A) a naphthalene ring-containing epoxy resin, (B) a biphenyl-containing epoxy resin, (C) a phenolic resin, and (D) an inorganic filler.

Component (A) is an epoxy resin having a substituted naphthalene ring of general formula (1).

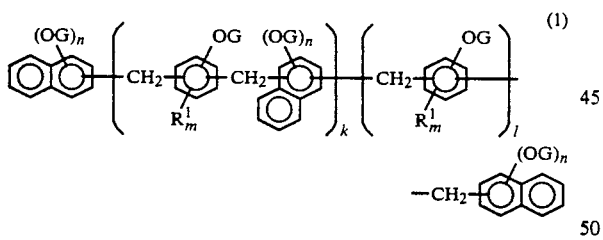
(1)

In formula (1), $R^1$ is a hydrogen atom or an alkyl group having 1 to 10 carbon atoms, OG is $$-O-CH_2CHCH_2,$$
$$\diagdown O \diagup$$

letter k is an integer of from 0 to 5, l is an integer of from 0 to 3, m is an integer of from 0 to 2, and n is equal to 1 or 2. When n is equal to 2, the two OG groups may be attached to either one ring or both rings of the naphthalene ring.

Illustrative, non-limiting examples of the epoxy resin having a naphthalene ring are given below.

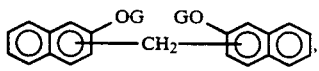

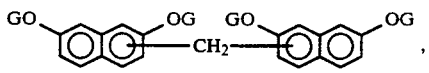

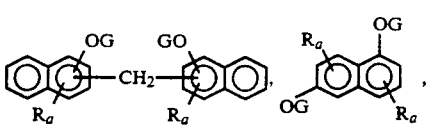

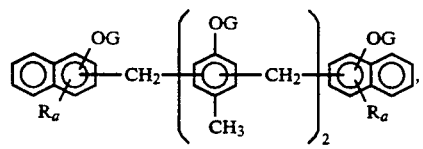

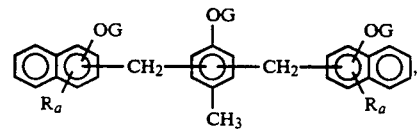

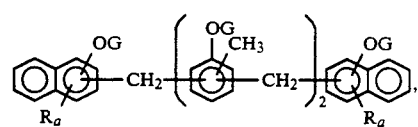

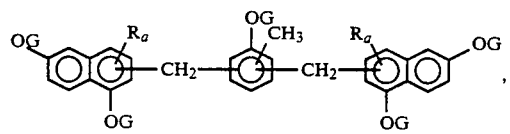

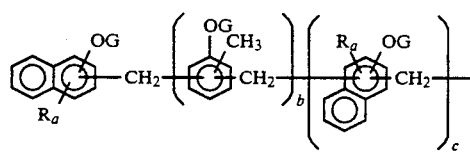

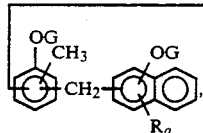

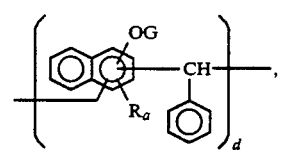

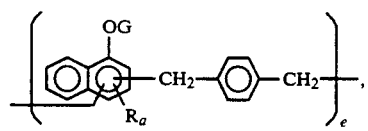

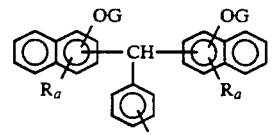

In the formulae, R is hydrogen or a monovalent hydrocarbon group having 1 to 5 carbon atoms, OG is

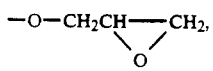

letter a is equal to 1 or 2, b, c, d, and e each are an integer of at least 2.

Component (B) is an epoxy resin containing a biphenyl group of general formula (2).

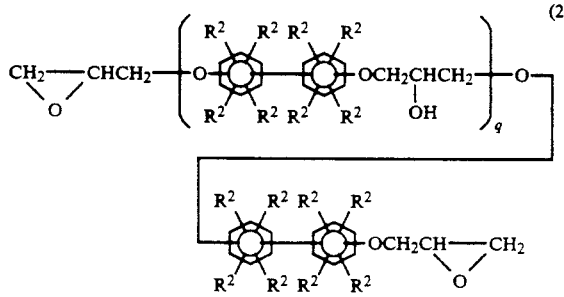

In formula (2), $R^2$ is a hydrogen atom, a halogen atom or a monovalent hydrocarbon group having 1 to 5 carbon atoms, and letter q is an integer of from 0 to 5. The biphenyl-containing epoxy resin, when combined with the naphthalene ring-containing epoxy resin, is effective for significantly improving the adhesion of cured products.

Illustrative, non-limiting examples of the epoxy resin having a biphenyl group are given below.

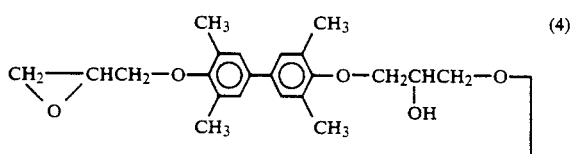

(4)

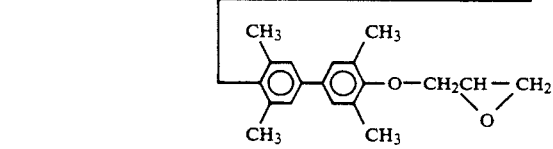

(5)

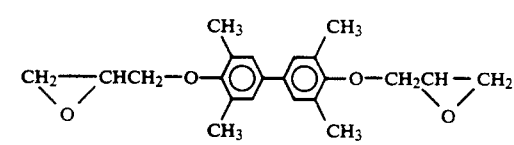

(6)

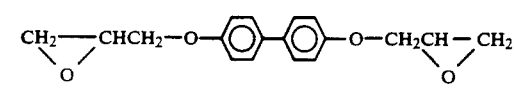

(7)

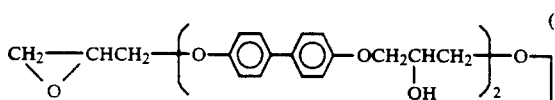

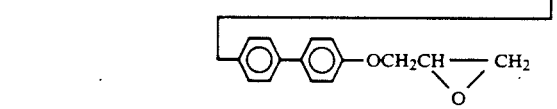

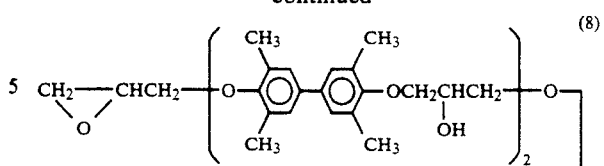

(8)

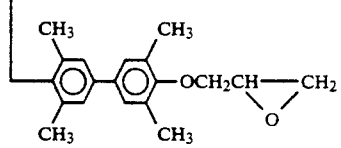

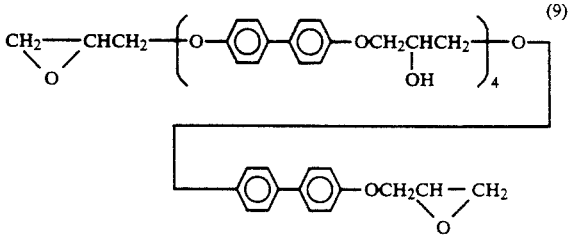

(9)

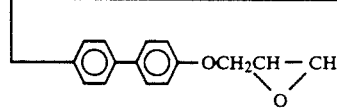

Preferred among these biphenyl-containing epoxy resins is the compound of formula (4) because it helps provide an epoxy resin composition with a low viscosity and a total chlorine content of up to 500 ppm.

The present invention uses both the naphthalene ring-containing epoxy resin (A) and the biphenyl-containing epoxy resin (B) as an epoxy resin base. Although the proportion of these epoxy resin components is not critical, it is preferred to mix components (A) and (B) in a weight ratio (A)/(B) of from 1/1 to 9/1, especially from 5/1 to 8/1. A ratio (A)/(B) of less than 1 would result in somewhat increased moisture adsorption, low Tg and less desirable heat resistance. With a ratio (YA)/(B) of more than 9, adhesion would lower and the melt viscosity would become too high to fully disperse epoxy resin components during preparation, resulting in some drawbacks in moldability and cured physical properties.

Essential epoxy resins used in the epoxy resin composition of the present invention are a naphthalene ring-containing epoxy resin and a biphenyl-containing epoxy resin both as defined above while any conventional epoxy resin may be additionally used. Typical of the additional epoxy resin are epoxy resins having at least two epoxy groups in a molecule, for example, bisphenol-A type epoxy resins, phenol novolak type epoxy resins, allyl phenol novolak type epoxy resins, triphenol alkane type epoxy resins and polymers thereof, dicyclopentadiene type epoxy resins, phenol aralkyl type epoxy resins, glycidyl ester type epoxy resins, cycloaliphatic epoxy resins, heterocyclic epoxy resins, and halogenated epoxy resins.

Preferably, the total content of naphthalene ring in the epoxy resins ranges from 5 to 80% by weight, especially from 10 to 60% by weight.

Component (C) is a phenolic resin which is a curing agent for epoxy resins (A) and (B). The phenolic resin (C) is of the following general formula (3).

(3)

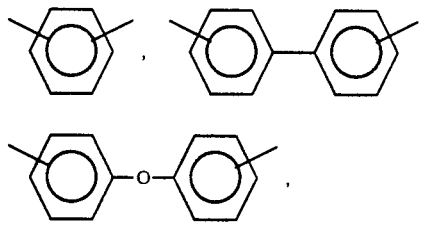

In formula (3), $R^3$ is selected from the group consisting of and substituted ones thereof in which some or all of the hydrogen atoms are replaced by $C_1$–$C_5$ alkyl groups, $R^4$ is a hydrogen atom or a $C_1$–$C_4$ alkyl group, and letter r is an integer of from 0 to 5.

Illustrative, non-limiting examples of the phenolic resin of formula (3) are given below.

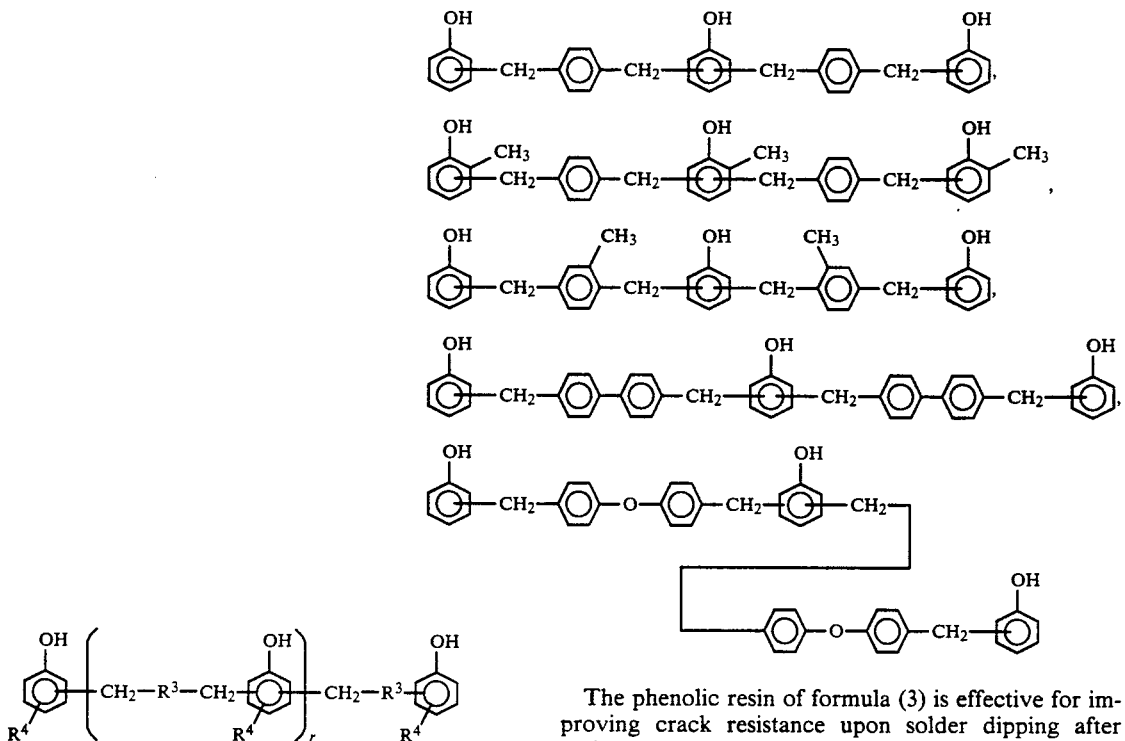

The phenolic resin of formula (3) is effective for improving crack resistance upon solder dipping after moisture absorption and reducing moisture absorption, but can sometimes lead to a lowering of Tg when used as a sole curing agent. Thus, rather than using the phenolic resin of formula (3) singly, if is desirable to use the phenolic resin of formula (3) in combination with other phenolic resins, for example, novolak type phenolic resins, resol type phenolic resins, triphenol alkane type resins and polymers thereof, and naphthalene ring-containing phenolic resins, as well as other curing agents such as amine curing agents and acid anhydride curing agents. Especially blends of the phenolic resin of formula (3) with a naphthalene ring-containing phenolic resin are best suited for minimizing moisture absorption without lowering Tg. Examples of the useful naphthalene ring-containing phenolic resin are given below.

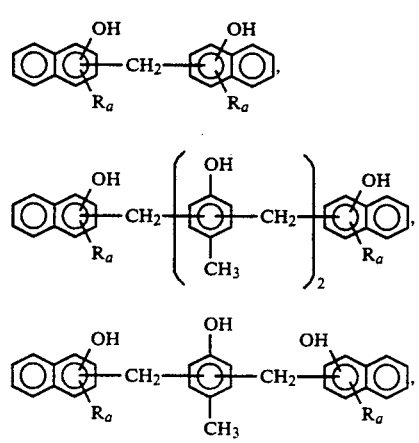

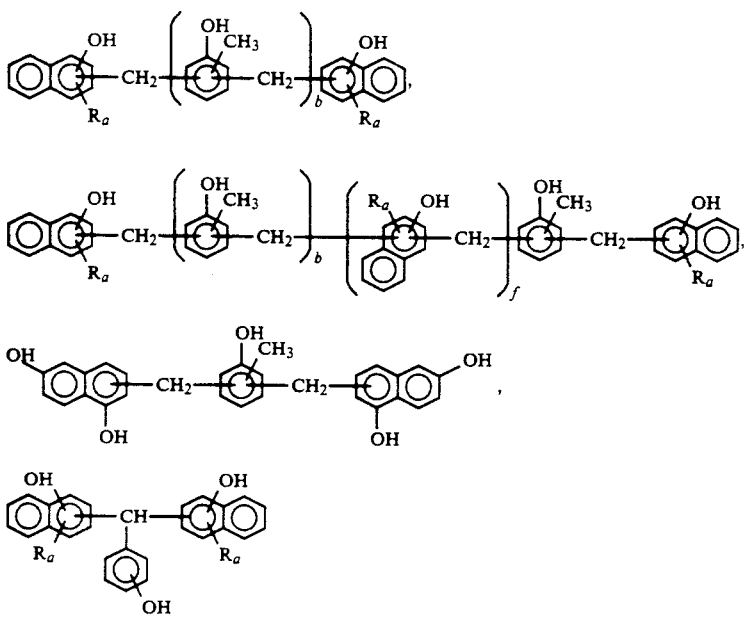

In the formulae, R, a, b, and c are as defined above and f is an integer of at least 1.

Preferably, the phenolic resin of formula (3) is contained in an amount of at least 10%, more preferably about 30 to 80% by weight of the total phenolic resins as component (C).

In the practice of the present invention, a silicone-modified copolymer (E) is preferably used in addition to naphthalene ring-containing epoxy resin (A), biphenyl-containing epoxy resin (B), and phenolic resin (C) for enhancing the benefits of the invention.

Preferred silicone-modified copolymers used herein are reaction products obtained by reaction between an alkenyl group-containing epoxidized novolak resin and-/or an alkenyl group-containing naphthalene resin and an organohydrogenpolysiloxane, more exactly, by addition reaction between alkenyl groups in the former and SiH groups in the latter.

The alkenyl group-containing epoxidized novolak resin may be obtained, for example, by epoxidizing an alkenyl group-containing phenolic resin with epichlorohydrin, or by partially reacting a conventional well-known epoxy resin with 2-allylphenol, etc. Preferred alkenyl group-containing epoxidized novolak resins are epoxidized phenol and cresol novolak resins containing an alkenyl group. Illustrative examples of the alkenyl group-containing epoxidized novolak resin are given below.

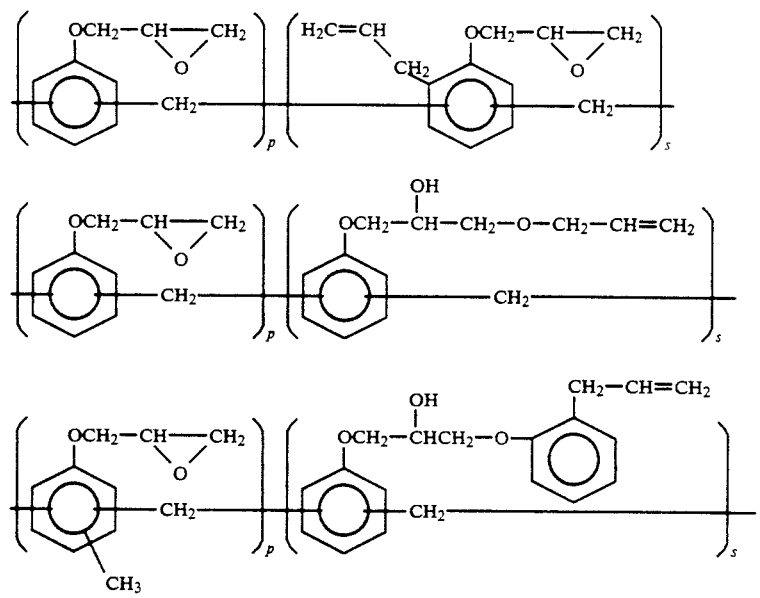

In the above formulae, p and s are positive numbers in the range of $1 < p < 10$ and $1 < s < 3$.

The alkenyl group-containing naphthalene resin constituting the copolymer is preferably of the general formula (10).

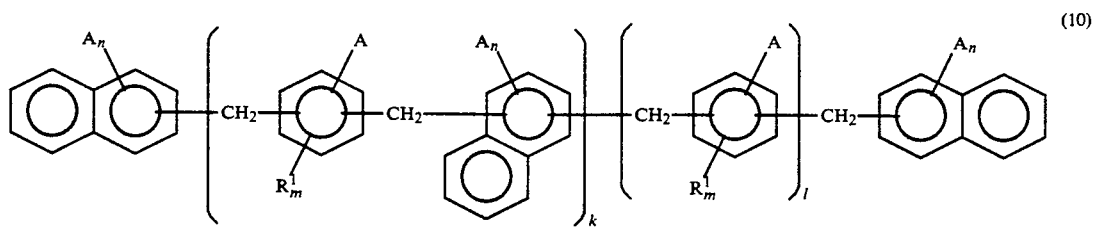

(10)

In formula (10), A is at least one of hydroxyl and -OG groups or an alkenyl-containing organic group having 1 to 10 carbon atoms, with the proviso that both the hydroxyl and/or -OG group and the alkenyl-containing organic group are present in a molecule, and $R^1$, OG#, k, l, m, and n are as defined above. Examples of the $C_{1-10}$ organic group containing an alkenyl group include vinyl, allyl, and vinyl or allyl-containing groups as represented by the following formula (11).

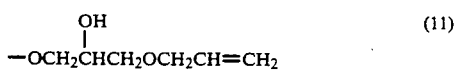

(11)

Other alkenyl-containing organic groups may be used insofar as they are susceptible to addition reaction with an ≡SiH group of an organohydrogenpolysiloxane.

Several illustrative, non-limiting examples of the alkenyl-containing naphthalene resin of formula (10) are given below.

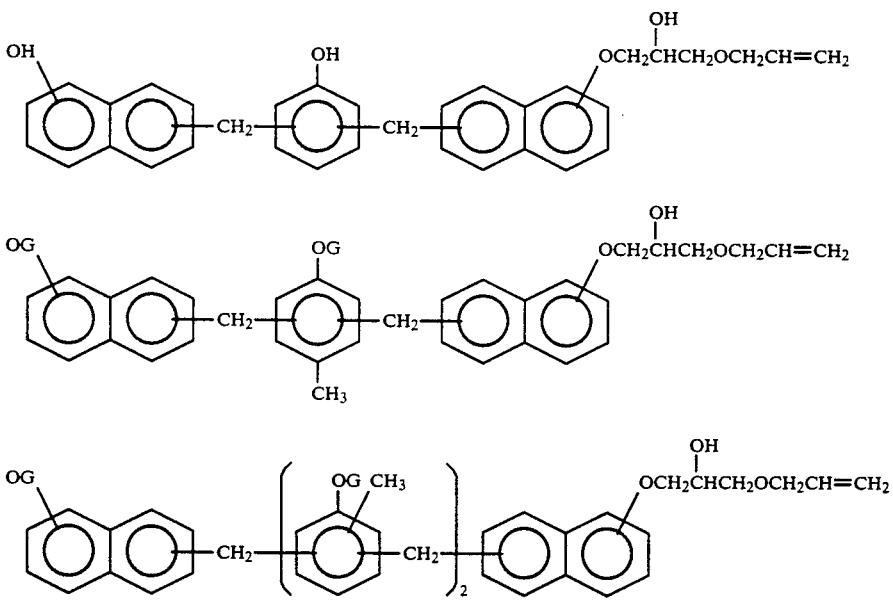

Organohydrogenpolysiloxanes are subject to addition reaction with alkenyl group-containing epoxidized novolak resin and/or alkenyl group-containing naphthalene resin as defined above for producing silicone-modified copolymers. The organohydrogenpolysiloxanes used herein are of the following formula (12):

...(12)

wherein $R^4$ is a substituted or unsubstituted monovalent hydrocarbon group, h is a number of from 0.01 to 0.1, j is a number of from 1.8 to 2.2, and $1.81 < h+j < 2.3$.

No particular limit is imposed on the organohydrogenpolysiloxane of formula (12) as long as it has at least one ≡SiH group in a molecule. Preferably, the number of silicon atoms is from 20 to 400 and the number of ≡SiH groups is from 1 to 5 per molecule. Examples of the substituted or unsubstituted monovalent hydrocarbon group represented by $R^4$ in formula (12) include alkyl groups such as methyl and ethyl groups, aryl groups such as phenyl group, haloalkyl groups, and cycloalkyl groups. Preferred polysiloxanes are both hydrogen-terminated methylpolysiloxane, both hydrogen-terminated methylphenylpolysiloxane, and both hydrogen-terminated methyl(2-trimethoxysilylethyl)polysiloxane.

Illustrative, non-limiting examples of the organopolysiloxane of formula (12) are given below as compounds of formulae (13) to (17).

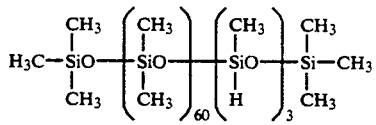

(13)

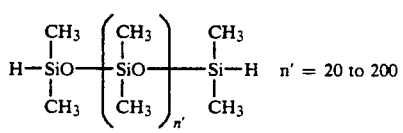

(14)

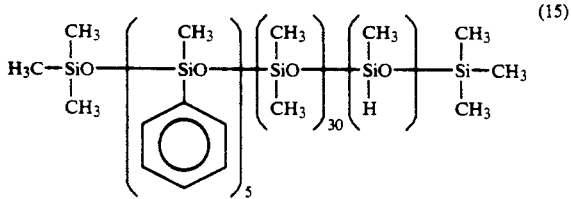 (15)

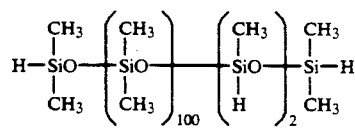 (16)

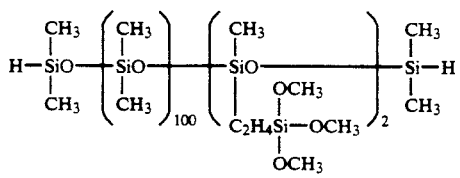 (17)

The organopolysiloxane of formula (12) preferably have a degree of polymerization of from 20 to 500, more preferably from 30 to 200. With organopolysiloxanes having a degree of polymerization of less than 20, the resulting composition would sometimes become less flexible and low in Tg. It is technically very difficult to synthesize organopolysiloxanes having a degree of polymerization of more than 500, and if possible, copolymers of such organopolysiloxanes are difficult to disperse in the epoxy resin composition, failing to achieve the objects of the invention. In general, organopolysiloxanes having a fixed silicone content tend to increase crack resistance and Tg, but lower dispersibility and adhesion to elements as the degree of polymerization increases. Dispersibility and adhesion to elements can be improved by introducing a modifying group as given below into side chains as represented by formula (17).

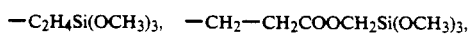

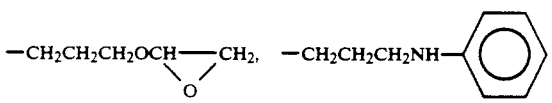

The silicone-modified copolymer which can be blended in the epoxy resin composition of the invention as an additional component (E) is obtained by reacting an alkenyl group-containing epoxidized novolak resin and/or an alkenyl group-containing naphthalene resin with an organohydrogenpolysiloxane having ≡SiH group of formula (12), all as defined above, at elevated temperatures in the presence of a well-known addition catalyst, for example, platinum catalyst, typically chloroplatinic acid.

The silicone-modified copolymer (E) helps an epoxy resin composition show especially improved properties including a high Tg, a low coefficient of expansion and high crack resistance due to the fact that the silicone-modified copolymer is immiscible with the (curable) epoxy resins, but assumes a sea-island structure in the epoxy resin composition. Therefore, the copolymer desirably has a solubility parameter of 7.3 to 8.5, especially 7.6 to 8.2. A copolymer having a solubility parameter within this range can be obtained by reacting an organopolysiloxane with an alkenyl group-containing epoxidized novolak resin and/or an alkenyl group-containing naphthalene resin under a condition: $0.7 < A/B < 7$ wherein A is the ≡SiH equivalent of the organopolysiloxane and B is the molecular weight of the alkenyl group-containing resin.

The silicone-modified copolymer is preferably blended in amounts of 0 to about 50 parts, more preferably from about 5 to about 40 parts by weight per 100 parts by weight of the epoxy resins (A) plus (B). More than 50 parts of the copolymer can sometimes be detrimental to adhesion improvement.

Desirably, the composition contains epoxy and phenolic hydroxyl groups in such quantities that the ratio of the quantity of epoxy group (x mol) to the quantity of phenolic hydroxyl group (y mol), x/y may range from $\frac{1}{2}$ to 3/2. Outside the range, curing property and low stress would be somewhat lost. Therefore, epoxy resins (A) and (B), phenolic resin (c) and silicone-modified copolymer (E) are preferably blended to meet this requirement.

Component (D) is an inorganic filler which may be selected from those commonly used for epoxy resins. Examples include silicas such as fused silica and crystalline silica, alumina, silicon nitride, aluminum nitride, boron nitride, titanium oxide, and glass fibers. Among these, fused silica is preferred, and fused silica having a mean grain size of about 3 to 15 μm is especially preferred from a molding aspect. The fused silica is desirably of spherical shape for high loadings and less stresses relative to the chip surface. The inorganic filler is preferably surface treated with silane coupling agents prior to blending in order to enhance the interfacial strength between the resin and the filler.

These inorganic fillers may be used alone or in admixture of two or more. The filler is preferably used in an amount of about 100 to about 1,000 parts, especially about 200 to about 700 parts by weight per 100 parts by weight of the total of components (A), (B) and (C) although the filler content is not particularly limited.

A curing catalyst may be blended in the epoxy resin composition of the invention. The curing catalysts used herein include imidazoles, tertiary amines, and phosphorus compounds. The preferred curing catalysts are mixtures of 1,8-diazabicyclo(5.4.0)undecene-7 and triphenylphosphine in a weight ratio of from 0:1 to 1:1, especially from 0.01:1 to 0.5:1. A higher proportion of 1,8-diazabicyclo(5.4.0)-undecene-7 beyond this range would sometimes lead to a lower Tg. The amount of the curing catalyst added is not particularly limited although it is preferably added in an amount of 0.2 to 2 parts, more preferably ( 0.4 to 1.2 parts by weight per 100 parts by weight of the total of components (A), (B) and (C).

The composition of the invention may further contain various well-known additives if desired. Exemplary additives include stress lowering agents such as thermoplastic resins, thermoplastic elastomers, organic synthetic rubbers, and silicones; mold release agents such as waxes (e.g., carnauba wax) and fatty acids (e.g., stearic acid) and metal salts thereof; pigments such as carbon black, cobalt blue, and red iron oxide; flame retardants such as antimony oxide and halides; surface treating agents such a silanes (e.g., glycidoxypropyltrimethoxysilane) and alkyl titanates; antioxidants; halogen trapping agents; other additives, and mixtures thereof.

The epoxy resin compositions of the invention may be prepared by mixing and agitating predetermined amounts of the necessary components uniformly, and milling the mixture in milling means preheated at 70° to 95° C., for example, a kneader, roll mill and extruder, followed by cooling and comminution. The order of mixing the components is not-critical.

The compositions of the invention are advantageously applicable in encapsulating various types of semiconductor device including SOP, SOJ, TSOP, and TQFP types. The compositions can be molded by conventional methods including transfer molding, injection molding, and casting. Most often, the epoxy resin compositions are molded at a temperature of about 150° to about 1800° C. for about 30 to about 180 seconds and post cured at a temperature of about 150° to about 1800° C. for about 2 to about 16 hours.

two-roll mill, cooling and comminuting the mixtures. The components used were epoxy resins, a phenolic resin, and a silicon-modified copolymer, all shown below and used in the amounts shown in Table 1, 0.6 parts of a curing catalyst shown below, 0.5 parts of triphenylphosphine, 250 parts of spherical fused silica having a mean grain size of 15 μm and a specific surface area of 1.4 m²/g, 250 parts of spherical fused silica having a mean grain size of 10 μm and a specific surface are of 2.5 m²/g, 70 parts of spherical fused silica having a mean grain size of 1.0 μm and a specific surface area of 10 m²/g, 8 parts of antimony trioxide, 1.5 parts of carbon black, 1 part of carnauba wax and 3 parts of γ-glycidoxypropyltrimethoxysilane.

| Epoxy resin | Epoxy equiv. | Softening point |
|---|---|---|
| (1) [structure] (containing more than 60% of one having a degree of polymerization k + 1 ≦ 2) | 215 | 70° C. |
| (2) [structure] | 190 | 107° C. |
| (3) [structure] | 240 | 110° C. |
| (4) Cresol novolak type epoxy resin EOCN 1020-65 (Nihon Kayaku K.K.) | 198 | 65° C. |
| (5) Brominated epoxy resin BREN-S (Nihon Kayaku K.K.) | 280 | 80° C. |

| Phenolic resin | OH equiv. | Softening point |
|---|---|---|
| (1) [structure] | 167 | 73° C. |
| (2) [structure] (containing more than 80% of one having a degree of polymerization k + 1 ≦ 2 and less than 5% of naphthol) | 142 | 80° C. |
| (3) Phenol novolak resin TD2131 (Dai-Nihon Ink K.K.) | 110 | 85° C. |

EXAMPLE

Examples of the present invention are given below together with comparative examples, by way of illustration and not by way of limitation. All parts are by weight.

Examples 1 to 8 and Comparative Examples 4

Epoxy resin compositions were prepared by uniformly melt mixing the following components in a hot Copolymer Copolymer (I) is an addition reaction product (organopolysiloxane content 34% by weight, epoxy equivalent 310) between the following compounds wherein numerals are average values.

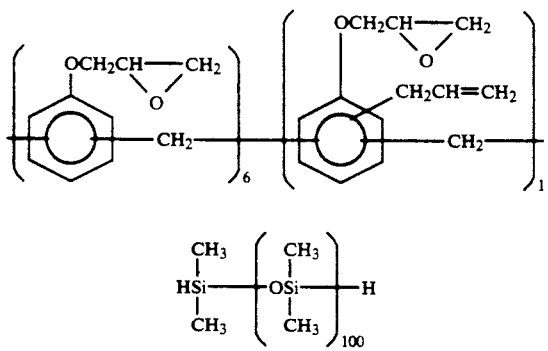

Copolymer (II) is an addition reaction product (organopolysiloxane content 34% by weight, epoxy equivalent 410) between the following compounds wherein numerals are average values.

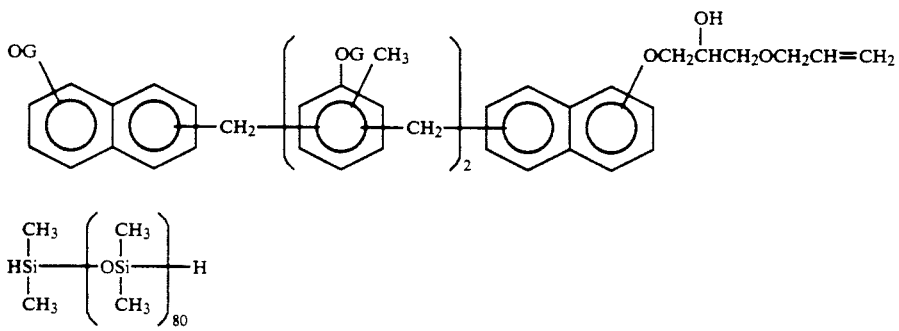

Curing catalyst

It was prepared by mixing 1,8-diazabicyclo(5.4.0)undecene-7 and phenol novolak resin TD2131 (manufactured by Dai-Nihon Ink K. K.) in a weight ratio of 20/80, heat melting them at 130° C. for 30 minutes, and atomizing to a size of less than 50 μm.

For these compositions, the following tests (A) to (G) were carried out. The results are show in Table 1.

(A) Spiral flow

Using a mold according to the EMMI standard, measurement was made at 180° C. and 70 kg/cm².

(B) Flexural strength and Flexural modulus

Test bars of 10×4×100 mm which were molded at 180° C. and 70 kg/cm² for 2 minutes and post cured at 180° C. for 4 hours were tested at 215° C. according to JIS K6911.

(C) Coefficient of linear expansion (μ) and Glass transition temperature (Tg)

Test pieces of 4 mm in diameter and 15 mm long were examined in accordance with the TMA method by heating the test pieces at a rate of 5° C./min.

(D) Crack resistance upon soldering after moisture absorption

Silicon chips of 2×4×0.4 mm were bonded to small outline package (SOP) lead frames (42 alloy) of 4×12×1.8 mm and then encapsulated with the epoxy resin compositions by molding at 180° C. and 70 kg/cm² for 2 minutes and post curing at 180° C. for 4 hours. The packages were allowed to stand in a hot humid atmosphere at 85° C. and RH 85% for 24 and 48 hours and then immersed for 10 seconds in a solder bath at 250° C. Then the packages were disintegrated to observe the occurrence of internal cracks. Reported is the number of cracked packages/the total number of packages tested.

(E) Moisture resistance

1-M DRAM chips were bonded to small outline J-leaded (SOJ) frames with 20 pins and then encapsulated with the epoxy resin compositions by molding at 180° C. and 70 kg/cm² for 2 minutes and post curing at 180° C. for 4 hours. The packages were allowed to stand for 24 hours in a hot humid atmosphere at 121° C. and RH 100%, then dipped for 10 seconds in a solder bath at 260° C., and again allowed to stand for 300 hours in a hot humid atmosphere at 121° C. and RH 100%. Reported is the number of Al wire broken packages/the total number of packages tested.

(F) Water absorption

Disks of 50 mm in diameter and 2 mm thick were molded at 180° C. and 70 kg/cm² for 2 minutes and post cured at 180° C. for 4 hours. The disks were allowed to stand in an atmosphere at 121° C./100% RH for 24 hours before the water absorption (percent) was measured.

(G) Adhesion

Cylinders of 15 mm in diameter and 5 mm high were molded on 42-alloy plates at 175° C. and 70 kg/cm² for 2 minutes and post cured at 180° C. for 4 hours. Using a push-pull gage, the force required to separate the molded cylinder from the 42-alloy plate was measured.

TABLE 1

|  | Example | | | | | | | |
|---|---|---|---|---|---|---|---|---|
|  | 1 | 2 | 3 | 4 | 5 | 6 | 7 | 8 |
| Composition, pbw | | | | | | | | |
| Epoxy resin (1) | 39.8 | 43.8 | 41.4 | 36.0 | 34.5 | 35.0 | 42.2 | 41.8 |
| Epoxy resin (2) | 9.9 | 7.7 | 10.4 | 15.4 | 8.6 | 8.8 |  | 5.2 |
| Epoxy resin (3) |  |  |  |  |  |  | 10.5 | 5.2 |
| Epoxy resin (4) |  |  |  |  |  |  |  |  |
| Epoxy resin (5) | 8 | 8 | 8 | 8 | 8 | 8 | 8 | 8 |
| Phenolic resin (1) | 42.3 | 24.3 | 20.1 | 20.3 | 19.5 | 19.1 | 19.6 | 19.9 |
| Phenolic resin (2) |  | 16.2 | 20.1 | 20.3 | 19.5 | 19.1 | 19.6 | 19.9 |
| Phenolic resin (3) |  |  |  |  |  |  |  |  |
| Copolymer (I) |  |  |  |  |  | 10 |  |  |

TABLE 1-continued

| | Example | | | | | | | |
|---|---|---|---|---|---|---|---|---|
| | 1 | 2 | 3 | 4 | 5 | 6 | 7 | 8 |
| Copolymer (II) | | | | | | 10 | | |
| Properties | | | | | | | | |
| Spiral flow, inch | 32 | 35 | 40 | 42 | 38 | 35 | 38 | 39 |
| Flexural strength, kg/mm$^2$ | 14.0 | 14.2 | 15.0 | 13.8 | 14.0 | 14.3 | 15.0 | 14.8 |
| Flexural modulus, kg/mm$^2$ | 1800 | 1840 | 1810 | 1800 | 1850 | 1880 | 1850 | 1825 |
| Tg, °C. | 150 | 152 | 163 | 155 | 160 | 158 | 163 | 161 |
| $v$, 10$^{-5}$/°C.  $\alpha_1$ | 1.1 | 1.0 | 1.0 | 1.1 | 1.0 | 1.0 | 1.0 | 1.0 |
| $\alpha_2$ | 4.4 | 4.3 | 4.2 | 4.5 | 4.3 | 4.3 | 4.2 | 4.2 |
| Crack resistance | 0/20 | 0/20 | 0/20 | 0/20 | 0/20 | 0/20 | 0/20 | 0/20 |
| Moisture resistance | 0/20 | 0/20 | 0/20 | 0/20 | 0/20 | 0/20 | 0/20 | 0/20 |
| Water absorption, % | 0.30 | 0.29 | 0.29 | 0.32 | 0.30 | 0.31 | 0.30 | 0.29 |
| Adhesion, kg | 30< | 28 | 28 | 30< | 30< | 30< | 26 | 27 |

TABLE 2

| | Comparative Example | | | |
|---|---|---|---|---|
| | 1 | 2 | 3 | 4 |
| Composition, pbw | | | | |
| Epoxy resin (1) | | | 53.9 | 47.5 |
| Epoxy resin (2) | | 47.6 | | 11.9 |
| Epoxy resin (3) | | | | |
| Epoxy resin (4) | 48.7 | | | |
| Epoxy resin (5) | 8 | 8 | 8 | 8 |
| Phenolic resin (1) | 43.3 | 44.4 | 1.9 | |
| Phenolic resin (2) | | | 36.2 | |
| Phenolic resin (3) | | | | 32.7 |
| Copolymer (I) | | | | |
| Copolymer (II) | | | | |
| Properties | | | | |
| Spiral flow, inch | 34 | 46 | 37 | 41 |
| Flexural strength, kg/mm$^2$ | 14.5 | 13.0 | 15.5 | 14.0 |
| Flexural modulus, kg/mm$^2$ | 1860 | 1760 | 1890 | 1820 |
| Tg, °C. | 147 | 130 | 159 | 162 |
| $v$, 10$^{-5}$/°C.  $\alpha_1$ | 1.1 | 1.2 | 1.0 | 1.0 |
| $\alpha_2$ | 4.5 | 4.5 | 4.2 | 4.3 |
| Crack resistance | 12/20 | 0/20 | 5/20 | 8/20 |
| Moisture resistance | 8/20 | 2/20 | 3/20 | 5/20 |
| Water absorption, % | 0.35 | 0.31 | 0.32 | 0.34 |
| Adhesion, kg | 16 | 30< | 9 | 12 |

As seen from Table 1, the composition which does not contain a naphthalene ring-containing epoxy resin of formula (1) and a biphenyl-containing epoxy resin of formula (2) (Comparative Example 1), the compositions which contain either one of these epoxy resins (Comparative Examples 2 and 3). the composition which contains both the epoxy resins, but not a phenolic resin of formula (3) (Comparative Example 4) exhibit poor moisture resistance and are low in at least one of Tg, crack resistance, and adhesion.

In contrast, the compositions containing both a naphthalene ring-containing epoxy resin and a biphenyl-containing epoxy resin and a phenolic resin (Examples 1 through 8) cure into products having high Tg and improved crack resistance, moisture resistance, and adhesion.

The compositions within the scope of the present invention show smooth flow and cure to products having low modulus of elasticity, especially at temperatures above Tg, a low coefficient of linear expansion, high Tg irrespective of low stresses, and minimized moisture absorption. Then the semiconductor devices encapsulated with the present compositions remain highly reliable even after being subject to thermal shocks upon surface mounting.

Although some preferred embodiments have been described, many modifications and variations may be made thereto in the light of the above teachings. It is therefore to be understood that within the scope of the appended claims, the invention may be practiced otherwise than as specifically described.

We claim:

1. An epoxy resin composition comprising
(A) a naphthalene ring-containing epoxy resin of the following general formula (1):

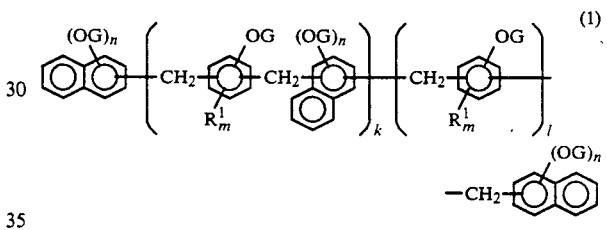

wherein R$^1$ is a hydrogen atom or an alkyl group having 1 to 10 carbon atoms, OG is

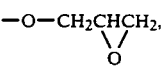

letter k is an integer of from 0 t 5, l is an integer of from 0 to 3, m is an integer of from 0 to 2, and n is equal to 1 or 2, and the OG groups may be attached to either one ring or both rings of the naphthalene ring, (B) a biphenyl-containing epoxy resin of the following formula (2):

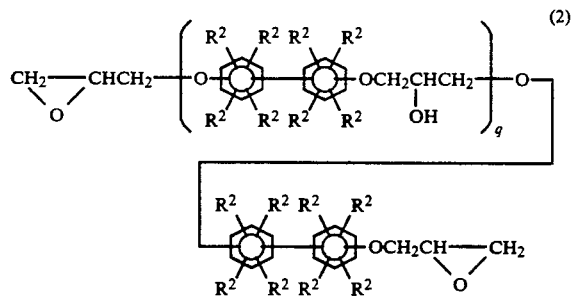

wherein R$^2$ is a hydrogen atom, a halogen atom or a monovalent hydrocarbon group having 1 to 5 carbon atoms, and letter q is an integer of from 0 to 5, (C) a phenolic resin of the following formula (3):

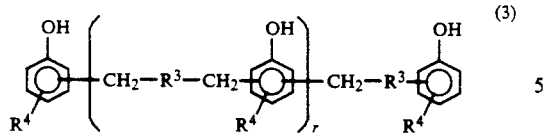

(3)

wherein $R^3$ is selected from the group consisting of

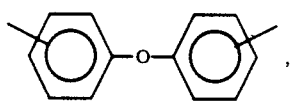

and substituted derivatives thereof in which some or all of the hydrogen atoms in the phenyl ring or rings in $R^3$ are replaced by alkyl groups having 1 to 5 carbon atoms, $R^4$ is a hydrogen atom or an alkyl group having 1 to 4 carbon atoms, and letter r is an integer of from 0 to 5, and (D) an inorganic filler present in an amount of 100 to 1,000 parts by weight of filler per 100 parts by weight of components (A), (B) and (C) combined, wherein components (A) and (B) are present in a weight ratio of 1/1 to 9/1 and wherein components (A), (B) and (C) contain epoxy and phenolic hydroxyl groups in such quantities that the molar ratio of epoxy groups to hydroxyl groups in said composition ranges from ½ to 3/2.

2. The epoxy resin composition of claim 1 wherein components (A) and (B) contain about 5 to 80% by weight of naphthalene ring.

3. The epoxy resin composition of claim 1 wherein 200 to 700 parts by weight of filler (D) is present per 100 parts by weight of components (A), (B) and (C) combined.

4. The epoxy resin composition of claim 1 which further comprises (E) a silicone-modified copolymer comprising an addition product of an organohydrogen polysiloxane and a resin selected from the group consisting of an alkenyl-containing, epoxidized novolak resin and an alkenyl-containing, naphthalene resin.

5. A semiconductor device encapsulated with the epoxy resin composition of any one of claims 3 or 4 in cured state.

6. The claim 1 epoxy resin composition wherein said component (A) is selected from the group consisting of:

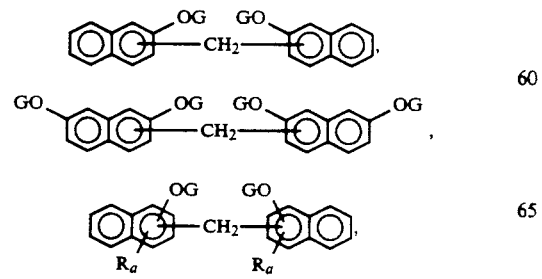

-continued

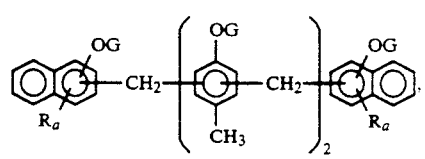

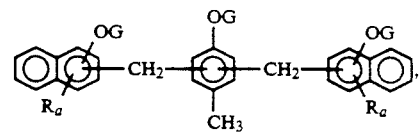

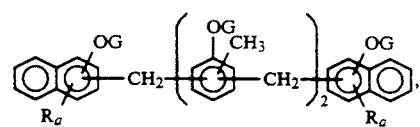

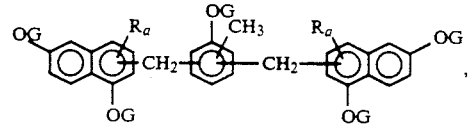

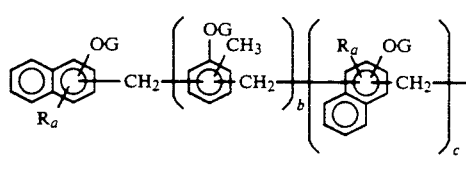

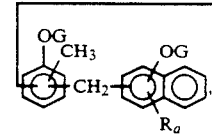

and

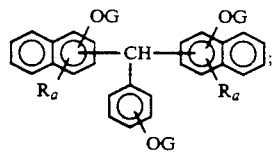

wherein R is hydrogen or a monovalent hydrocarbon group having 1 to 5 carbon atoms, OG is

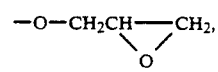

letter a is equal to 1 or 2, and b and c each are an integer of at least 2.

7. The claim 1 epoxy resin composition wherein said component (B) is selected from the group consisting of:

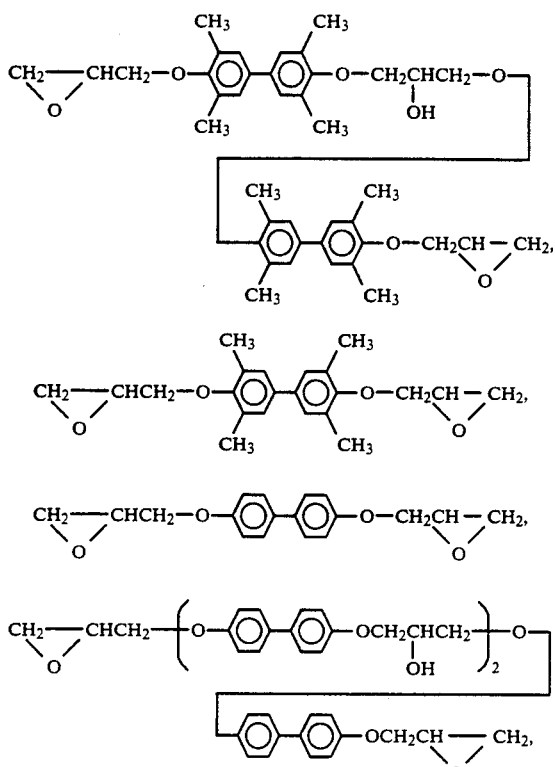

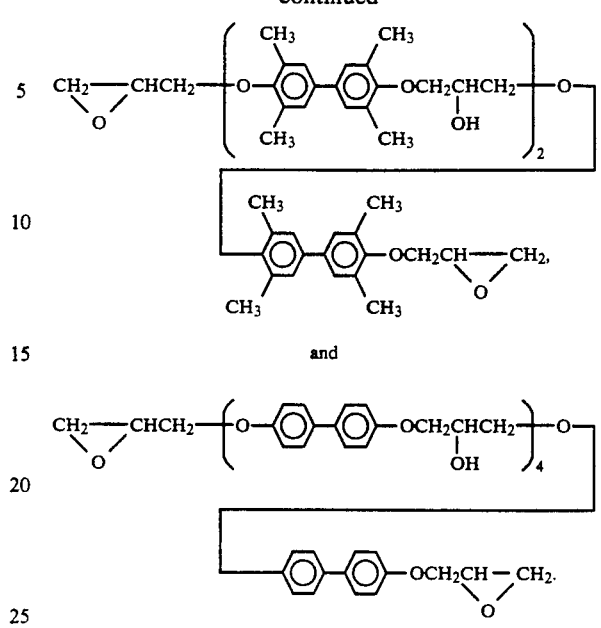

8. The claim 1 epoxy resin composition wherein said component (C) is selected from the group consisting of:

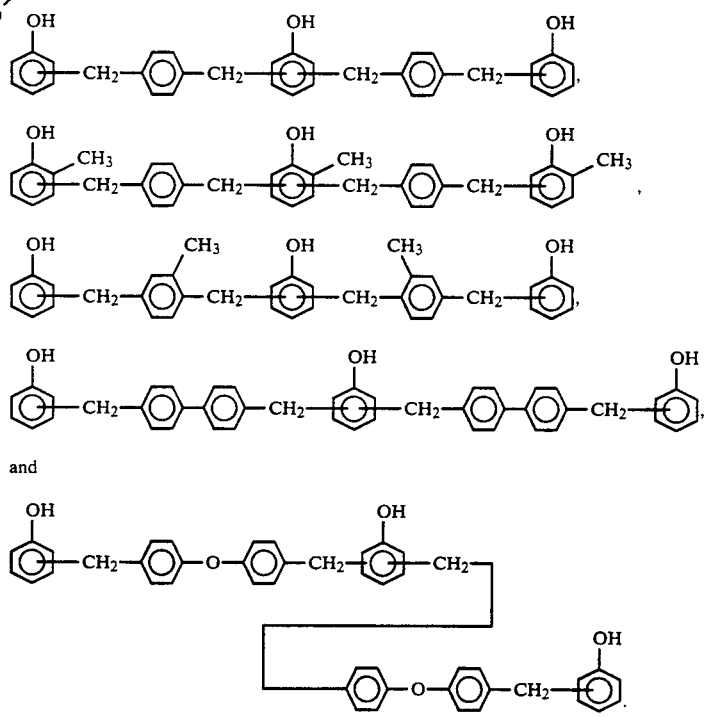

9. The claim 1 epoxy resin composition which further comprises an additional epoxy resin.

10. The claim 9 epoxy resin composition wherein said additional epoxy resin is selected from the group consisting of bisphenol-A epoxy resins, phenol novolak epoxy resins, allyl phenol novolak epoxy resins, tri-phenol alkane epoxy resins, dicyclopentadiene epoxy resins, phenol aralkyl epoxy resins, glycidyl ester epoxy resins, cycloaliphatic epoxy resins, heterocyclic epoxy resins, and halogenated epoxy resins.

11. The claim 1 epoxy resin composition which further comprises an additional phenolic resin.

12. The claim 11 epoxy resin composition wherein said additional phenolic resin is selected from the group consisting of novolak phenolic resins, resol phenolic resins, triphenol alkane resins, and naphthalene ring-containing phenolic resins.

13. The claim 12 epoxy resin composition wherein said naphthalene ring-containing phenolic resins are selected from the group consisting of:

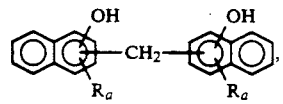

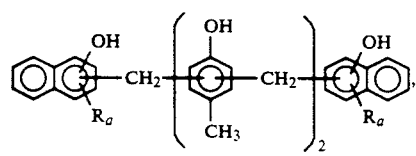

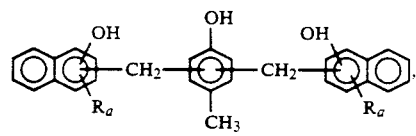

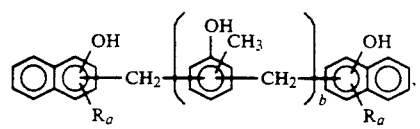

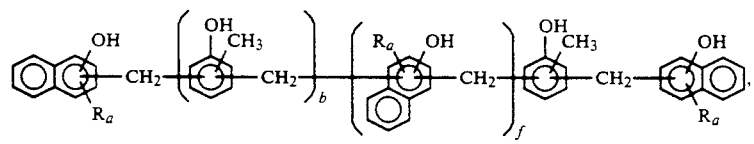

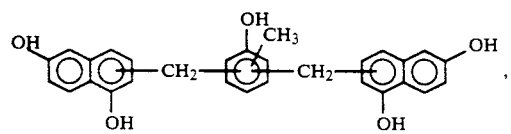

and

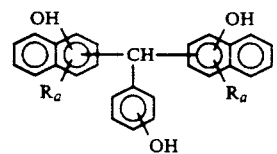

wherein R, a and b are as defined above and f is an integer of at least 1.

14. The claim 1 epoxy resin composition wherein said component (D) is selected from the group consisting of silica, alumina, silicon nitride, aluminum nitride, boron nitride, titanium oxide, glass fibers and mixtures thereof.

15. A semiconductor device encapsulated with an epoxy resin composition in a cured state, said epoxy resin composition comprising:

(A) a naphthalene ring-containing epoxy resin of the following general formula (1):

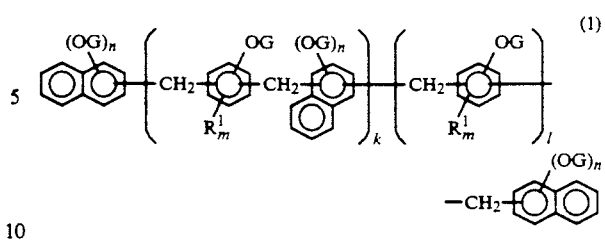

wherein $R^1$ is a hydrogen atom or an alkyl group having 1 to 10 carbon atoms, OG is

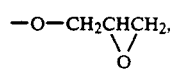

letter k is an integer of from 0 to 5, l is an integer of from 0 to 3, m is an integer of from 0 to 2, and n is equal to 1 or 2, and the OG groups may be attached to either one ring or both rings of the naphthalene ring, (B) a biphenyl-containing epoxy resin of the following formula (2):

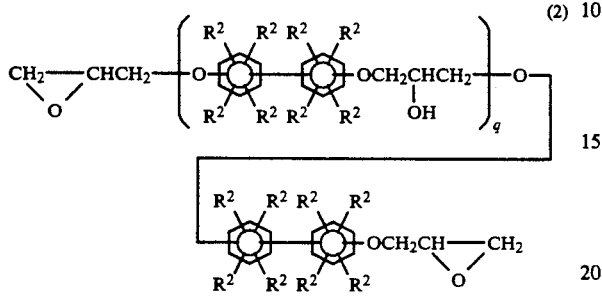

wherein $R^2$ is a hydrogen atom, a halogen atom or a monovalent hydrocarbon group having 1 to 5 carbon atoms, and letter q is an integer of from 0 to 5, (C) a phenolic resin of the following formula (3):

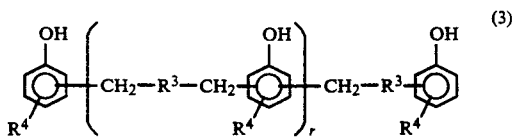

wherein $R^3$ is selected from the group consisting of

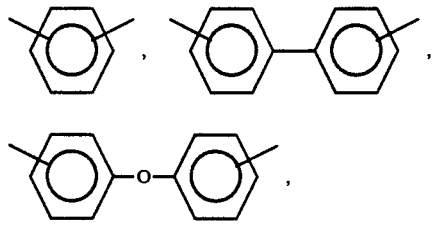

and substituted derivatives thereof in which some or all of the hydrogen atoms in the phenyl ring or rings in $R^3$ are replaced by alkyl groups having 1 to 5 carbon atoms, $R^4$ is a hydrogen atom or an alkyl group having 1 to 4 carbon atoms, and letter r is an integer of from 0 to 5, and (D) an inorganic filler, wherein components (A) and (B) are in a weight ratio of 1/1 to 9/1 and wherein components (A), (B) and (C) contain epoxy and phenolic hydroxyl groups in which quantities that the molar ratio of epoxy groups to hydroxyl groups ranges from $\frac{1}{2}$ to 3/2.

* * * * *